United States Patent
Pers et al.

(10) Patent No.: US 8,845,814 B2
(45) Date of Patent: Sep. 30, 2014

(54) WASHER SUCH AS A DISHWASHER OR A WASHING MACHINE AND METHOD FOR OPERATING A WASHER

(75) Inventors: Per-Erik Pers, Mora (SE); Sarah Forster, Stockholm (SE); Niklas Olson, Stockholm (SE)

(73) Assignee: Electrolux Home Products Corporation N.V., Brussels (BE)

( * ) Notice: Subject to any disclaimer, the term of this patent is extended or adjusted under 35 U.S.C. 154(b) by 86 days.

(21) Appl. No.: 13/388,867

(22) PCT Filed: Jul. 30, 2010

(86) PCT No.: PCT/EP2010/004659
§ 371 (c)(1),
(2), (4) Date: Feb. 3, 2012

(87) PCT Pub. No.: WO2011/015314
PCT Pub. Date: Feb. 10, 2011

(65) Prior Publication Data
US 2012/0124757 A1    May 24, 2012

(30) Foreign Application Priority Data
Aug. 5, 2009    (EP) ..................... 09010115

(51) Int. Cl.
B08B 7/04    (2006.01)
A47L 15/00    (2006.01)
A47L 15/42    (2006.01)

(52) U.S. Cl.
CPC ......... *A47L 15/0049* (2013.01); *A47L 2401/26* (2013.01); *A47L 2501/32* (2013.01); *A47L 2501/01* (2013.01); *A47L 2401/14* (2013.01); *A47L 15/0089* (2013.01); *A47L 15/4225* (2013.01); *A47L 2501/05* (2013.01); *A47L 2401/06* (2013.01); *A47L 15/4217* (2013.01); *A47L 2501/26* (2013.01); *A47L 2501/30* (2013.01); *A47L 15/4291* (2013.01)
USPC .............. 134/18; 134/25.2; 134/42; 68/12.02

(58) Field of Classification Search
USPC ................... 134/18, 25.2, 25.3, 42; 68/12.02
See application file for complete search history.

(56) References Cited

U.S. PATENT DOCUMENTS 3,698,406 A    10/1972    Sato et al.
3,885,580 A     5/1975    Cushing
(Continued)

FOREIGN PATENT DOCUMENTS

CN    1833599 A    9/2006
CN    2933277 Y    8/2007
(Continued)

OTHER PUBLICATIONS

English translation of DE10314892 Sep. 12, 2013.*
(Continued)

*Primary Examiner* — Saeed T Chaudhry
(74) *Attorney, Agent, or Firm* — Alston & Bird LLP

(57) ABSTRACT

The invention relates to methods for operating a washer, and in preferred embodiments to a washer having a water tank that is integrally, preferably detachably, formed with the washer, wherein the washer comprises a washing chamber for accommodating goods to be cleaned, said washing chamber having in its lower portion a sump for collecting water during operation of the washer, a water inlet, a circulating pump for circulating water through the washing chamber, and a control unit for controlling a washing cycle carried out by the washer. In accordance with the invention, in this method water is fed via the water inlet into the sump; the pressure within an inlet or outlet conduit of the circulating pump is measured; and based on the pressure measurement the washing cycle is controlled and/or indicator signals are issued to a user of the washer.

7 Claims, 2 Drawing Sheets

(56) References Cited

U.S. PATENT DOCUMENTS

| | | | |
|---|---|---|---|
| 6,418,943 B1 * | 7/2002 | Miller | 134/104.1 |
| 2004/0099287 A1 | 5/2004 | Shin | |
| 2012/0312325 A1 | 12/2012 | Gnadinger et al. | |

FOREIGN PATENT DOCUMENTS

| | | | |
|---|---|---|---|
| CN | 101401717 A | | 4/2009 |
| DE | 1503761 A1 | | 4/1969 |
| DE | 44 38 295 A1 | | 7/1996 |
| DE | 4400877 C2 | | 7/1997 |
| DE | 102 46 017 A1 | | 4/2004 |
| DE | 10314892 | * | 10/2004 |
| DE | 20 2006 000 256 U1 | | 4/2006 |
| DE | 10 2004 057 019 A1 | | 6/2006 |
| DE | 102004057019 | * | 6/2006 |
| EP | 0 080 948 A1 | | 6/1983 |
| EP | 0 546 434 A1 | | 6/1993 |
| EP | 0 569 733 A1 | | 11/1993 |
| EP | 1358833 | * | 5/2003 |
| EP | 1 358 833 A2 | | 11/2003 |
| EP | 1 464 268 A2 | | 10/2004 |
| EP | 2 009 408 A2 | | 12/2008 |
| WO | WO 2004/023967 A1 | | 3/2004 |

OTHER PUBLICATIONS

International Search Report for International Application No. PCT/EP2010/004658, mailed Dec. 2, 2010.

International Search Report for International Application No. PCT/EP2010/004659, mailed Feb. 16, 2011.

* cited by examiner

WASHER SUCH AS A DISHWASHER OR A WASHING MACHINE AND METHOD FOR OPERATING A WASHER

CROSS REFERENCE TO RELATED APPLICATIONS

This application is a national stage application filed under 35 U.S.C. 371 of International Application No. PCT/EP2010/004659, filed Jul. 30, 2010, which claims priority from European Patent Application No. 09010115.5, filed Aug. 5, 2009, each of which is incorporated herein in its entirety.

BACKGROUND

The present invention relates to a washer, such as a dishwasher or a washing machine, comprising a washing chamber for accommodating goods to be cleaned, said washing chamber having in its lower portion a sump for collecting water during operation of the washer, a water inlet, preferably wherein the water inlet can be connected to a water tank, a circulating pump for circulating water through the washing chamber, and a control unit for controlling a washing cycle carried out by the washer. The present invention further relates to a method for operating such a washer.

There is a constant desire in the art to improve the efficiency of washers, so as to on the one hand improve the operating comfort for the user and on the other hand reduce the amounts of energy and water that are consumed during each washing cycle. Whereas the latter applies to any kind of washer, monitoring and controlling the amount of water is of particular importance when the supply of water available to the washer is limited.

Thus, while the majority of the dishwashers and washing machines which presently are on the market are designed to be permanently connected to a continuously provided water supply, such as in a domestic household to a tap which when opened continuously feeds water, in recent years washers were developed which are supplied with water from a water supply tank, such as a relatively small tank, which is designed to be filled prior to any automatic program cycle carried-out in the washer under the control of a control unit of the washer and which is integrated into the washer or is designed as an external tank to which the washer is connected. Such washers thus are particularly suited for small households, in which only small amounts of articles are to be cleaned, for mobile devices such as motor homes, camper vans, yachts and the like, or households which are not permanently supplied with running water.

While the present invention can be used to any kind of washer, such as dishwashers or washing machines for washing clothes, in the following it will be described in connection with dishwashers.

An example for such a washer is shown in DE 10 2004 057 019 A1 which describes a water supplied domestic appliance, in particular a dishwasher, which is connected to a integrated tank, which is filled with an amount of water as it is required for a washing cycle. The water from the tank is fed to the sump within the washing chamber of the dishwasher either by means of a feed pump which is connected to the water supply system of the dishwasher or is fed to the sump by the action of the hydrostatic pressure prevailing within the tank.

SUMMARY

It is an object of the present invention to provide for a washer of the afore-mentioned type and a method for operating such washer, by which the efficiency of the washer is improved.

The above object is solved by the present invention in that according to claim 11 in a washer of the afore-mentioned type in which the water tank is integrally, preferably detachably, formed with the washer, the tank is arranged to feed water via the water inlet into the sump by the action of the hydrostatic pressure prevailing within the tank, wherein a pressure sensor is provided, which is located within an inlet or outlet conduit of a circulating pump comprised in the washer and an output of which is connected to a control unit of the washer that is adapted to modify or terminate a program cycle of the washer and/or to output indicator signals to the user of the washer that are based on signals delivered from the pressure sensor.

Preferably, the integrated tank is adapted to take up an amount of water that is essentially limited to the amount of water needed to execute a single program cycle. The latter is an advantage in a small portable washer of the invention. The integrated tank of the washer can be formed in one piece with the washer, however preferably the integral tank is detachably connected with the washer; still preferably, the detachable tank, is adapted to take up an amount of water that is essentially limited to the amount of water need to execute a single program cycle. The detachable tank has the advantage that it can be taken off the washer and carried easily to a water tap for refilling. The latter is particularly easy for a small tank that is adapted to take up an amount of water that is essentially limited to the amount of water need to execute a single program cycle.

At least one pressure sensor is provided in the washer. The pressure sensor can be arranged to measure the water pressure on the suction side, preferably within an inlet conduit of the circulation pump, and/or on the pressure side, preferably within an outlet conduit of the circulation pump of the washer. Preferably, the pressure sensor is arranged on the suction side of the circulation pump, in particular within an inlet conduit of the circulation pump, which has the advantage that the pressure sensor is arranged in direct communication with the sump which is most suitable for measuring the water level in the sump during initial filling of the sump with water at the start of a program cycle.

With advantage, an analog pressure sensor, such as is described for example in DE 20 2006 00256 U1, can be used, because it can provide repeated readings that closely follow the changes of the water pressure within the sump during the program cycle, in particular during the initial filling of the sump with water and/or during the operation of the circulation pump.

In accordance with the present invention the pressure sensor which is located within an inlet or outlet conduit of the circulating pump can be used in several ways.

In a first preferred embodiment of the method of the present invention the pressure sensor is used to detect the direction of rotation of the impeller of the circulation pump in a washer, in which the pump motor rotates only in one direction. For costs reasons it would be advantageous to use pump motors, in which the rotation direction of the impeller that is connected to the motor is not defined and which pump motors thus can start in both directions.

While the latter bi-directionally rotating pumps usually are equipped with a rotation-symmetric impeller, the efficiency of pressure and flow rate of these impellers can be improved, if non-rotation symmetric impellers are used. However, since in this case the impeller only will have a high efficiency, if it is rotated in the direction of rotation for which it is designed, it has to be ascertained that the pump has been started with the impeller rotating in the correct direction of rotation.

To this end, in a first embodiment of the method of the present invention, the pressure within the inlet conduit of the circulation pump is measured when the circulation pump is started and is compared with a predetermined value. If the measured value is above the predetermined value, the circulation pump is stopped and restarted until a different direction of rotation of the impeller is achieved. This method thus makes use of the fact that at the outlet of the circulation pump from which the water is fed, for example, to a spray arm of a dishwasher, a higher pressure corresponds to a lower pressure at the suction side of the pump. The negative pressure detected by the pressure sensor located within the inlet conduit of the circulation pump thus shows whether the pump is rotating in the correct direction. If a too high value has been measured, it is assumed that the impeller of the circulation pump rotates in the wrong direction. Hence, the circulation pump is stopped and is restarted. If the impeller, upon restart, now rotates in the correct direction, the pressure within the inlet conduit of the circulation pump decreases and hence the operation of the circulation pump no longer is stopped, but rather is continued. In contrast, if the circulation pump upon restart again rotates in the wrong direction at least one further restart is executed until the circulation pump rotates in the correct direction. In an alternate embodiment of such first method of the present invention, the pressure is measured within the outlet conduit of the circulation pump when the circulation pump is started. Since now a high-pressure value indicates that the impeller is rotating in the correct direction, the operation of the circulation pump is stopped, if the measured value is below a predetermined value, to then restart the pump so as to achieve a different direction of rotation of the impeller.

The above methods in accordance with the first embodiment of the method of the present invention thus allow to use cheaper and more simple circulation pumps, which by using non-rotation symmetric impellers nevertheless can provide for a similar delivery rate as the more expensive and more complicated unidirectional pump motors, wherein the method in a simple and efficient manner guarantees that the impeller of the pump is rotated in the correct direction.

Whereas in the first embodiment of the method of the present invention the water supply tank of the washer of the invention and/or of a washer as used in the method of the invention in principle can be of any size and can be a large central tank which supplies several users and their respective washer, it is preferred that the washer comprises an integrated tank, and particularly an integrated tank which is adapted to take up an amount of water that is essentially limited to the amount of water needed to execute a single program cycle.

A second preferred embodiment of the method of the present invention is particularly adapted for a washer in which the water inlet to the sump is connected to a water tank, preferably a water tank that is integrally, still preferably detachably, formed with the washer. In this method water is fed from the tank via the water inlet into the sump by the action of the hydrostatic pressure prevailing within the water tank, that is the initial filling of the sump with water is effected while the circulation pump is still switched off. The initial filling process is monitored by executing a multitude of at least two, preferably more, subsequent pressure measurements within an inlet or outlet conduit of the circulating pump. The measured values are stored to be compared with the values of subsequent measurements so as to obtain a differential value and to generate a warning message, should the differential value be less than a predetermined value. The method of this embodiment makes use of the fact that upon filling water from the tank into the sump, the pressure value inside the sump should continuously change. That is, at the inlet side of the circulation pump, which is connected to the sump of the washing chamber the pressure signal will be proportional to the height of the water level within the sump, i.e. is a direct measure of the filling level of the washing chamber. Of course the measurements during initial water filling of the sump are also possible, if the pressure sensor is arranged on the pressure side of the circulation pump. However, then the water must be able to pass first through the circulation pump in order to reach the pressure sensor, which however is readily possible with most pumps.

In the second preferred embodiment of the method of the invention, the washer control unit preferably continues an initial filling stage at the beginning of the program cycle, during which water is filled into the sump, until a signal from the pressure sensor issues a signal that is indicative that a predetermined level of water within the sump has been reached. Still preferably, the circulation pump is not operated during said initial filling stage.

Still preferably, the washer control unit measures an initial filling time that is needed from the beginning of said initial filling stage until the pressure sensor issues said signal that is indicative that the predetermined level of water within the sump has been reached, wherein said initial filling time is proportional to the quantity of water that is present in the tank. In a scarce water circumstance wherein the water tank is empty or the water tank does not contain the necessary amount of water that is necessary to complete the program cycle, said initial filling time will be longer as compared to a circumstance wherein the tank comprises a sufficient amount of water to execute a complete program cycle and the washer control unit can detect said scarce water circumstance by suitably comparing said initial filling time with a preset or stored previous initial filling time. Preferably, the washer control unit issues an alert signal to a user upon detecting said scarce water circumstance.

In case that the pressure measured by the pressure sensor does not or not sufficiently change, it therefore can be assumed that there is an error in the feed system, such as that the tank inadvertently has not been filled or has not been properly connected. Thus, in case that the differential value is less than a predetermined value, a warning message which may be an optic or acoustic signal is generated so as to alert the user.

In addition to generating a warning message, the method also may pause the operation of the washer, if the differential value is less than a predetermined value, i.e. if the water level within the washing chamber does not change as expected.

In order to prevent that an instantaneous variation in the water feed causes generation of a warning message, the differential value may be obtained by comparing the values of measurements between which a predetermined period of time has lapsed, or by monitoring the pressure change over a certain time interval, such as by integrating the measured values.

Preferably, upon generation of a warning message, it is checked whether there was an interaction with the user of the machine, such as by checking a sensor which is assigned to the door or to the tank of the dishwasher, wherein after an interaction has been detected another checking cycle is performed so as to determined whether the problem has been resolved. In such latter embodiment of the method of the present invention it is thus avoided that the program cycle is carried-out with a too small water amount, which else could lead to an unsatisfactory washing result and a shortened usable lifetime of the circulation pump. Furthermore, it is prevented that due to the insufficient filling of the sump the program cycle is not initiated, because the program is waiting for a respective filling signal, without the user of the machine getting notice thereof.

As noted above, the use of a pressure sensor is of particular advantage when the supply of water that is available to the washer is limited, such as in a washer having an integrated tank which is adapted to take up an amount of water that is essentially limited to the amount of water needed to execute a single program cycle.

In a further preferred embodiment of the method of the present invention the pressure is measured when the circulation pump is in operation, preferably in the water inlet of the circulating pump, i.e. at the suction side of the pump, and the measured value is stored and compared with a predetermined value. If it is determined that, within a predetermined time interval, a predetermined number of measured values exceeds the predetermined value, this is indicative to the washer control unit that unwanted cavitation of the circulation pump occurs. The pressure sensor is arranged on the suction side, preferably within the inlet conduit of the circulation pump. In that position the pressure sensor provides a negative pressure signal during operation of the circulation that reflects the action of the pump. However, it has been found by the invention that if cavitation occurs as is described herein further below, it can be detected by as pressure sensor that is arranged on the suction side of the pump in the form of a pressure signal that is not as negative as expected. During continuous monitoring of the pressure, cavitation is detected as a typical slight periodical increase in pressure. It is preferred to use an analogue pressure sensor for the detection of cavitation.

The above further embodiment of the method of the present invention that makes use of a pressure sensor signal that is indicative to the washer control unit that unwanted cavitation of the circulation pump occurs makes use of the fact that during normal operation of the pump a constant pressure signal is to be expected, whereas cavitation typically causes a slight periodical increase in pressure. According to the present embodiment, such slight periodical increase in pressure can be detected by the pressure sensor and evaluated by the washer control unit when during operation of the circulation pump within a predetermined time interval a predetermined number of measured values exceeds a predetermined value. Particularly in washers which are not connected to a continuous water supply, but in which the sump is supplied with water from a tank, the volume of which necessarily is limited, so that the dishwasher usually is run with as little water as possible, the circulation pump of the dishwasher is prone to cavitation.

Cavitation is caused by the formation of water vapor bubbles in regions of the circulation pump where the pressure of the process water falls below its vapor pressure, what may occur when the water head at the inlet of the circulation pump is too low. Such low water level may be caused by objects within the washer taking up an excessive amount of water, such as glasses or cups which during the washing cycle inadvertently are turned upside up and then fill with water, which water volume thus is missing in the volume of water that is available for circulation through the washer. Cavitation has a negative impact on the flow and the pressure within the circuit and thus deteriorates the efficiency of the pump and hence the performance of the washer. Furthermore, cavitation results in noise and in vibrations and can cause damages of the respective parts, thus shortening the usable lifetime of the pump.

Taking into account that cavitation typically causes a slight periodical increase in pressure, in the further preferred embodiment of the method of the present invention it is checked whether, within a predetermined time interval of for example 5 to 15 seconds, preferably of about 10 seconds, the measured pressure exceeds the predetermined value, i.e. the target pressure. Should this be the case, it is assumed that cavitation at the circulation pump has occurred. If cavitation is detected by the pressure sensor, the washer control unit takes corresponding countermeasures.

A first alternative of a countermeasure is that the washer control unit triggers the feeding of a rated amount of water into the sump. Said first countermeasure however is preferably executed in a washer that has a tank of a sufficient volume to allow such additional water feed and still retain sufficient water to execute the remainder of the initiated program cycle.

In a second alternative of a countermeasure that is particularly preferred in the case of a washer with a small water tank, the washer control unit stops the program cycle and outputs an alarm signal to the user. With particular advantage, the washer can in addition comprise a sensor that is able to sense a user interaction, such as opening of a door of the washer or removal of the tank followed by readjustment of the tank, that can be indicative of a refill of the water tank by the user, and the control unit can resume the stopped program cycle after receiving a corresponding signal from said sensor.

In a further more sophisticated version of the further embodiment of the method of the invention, a certain cavitation level is assumed in dependency of the number of subsequently measured values which exceed the predetermined value, and in which the amount of water which then is fed into the sump is rated in dependency of the cavitation level. Such method could be exemplified, for example, by assigning a cavitation level of 1, if it is determined that within a time span of, for example, 10 seconds two of the measured values are higher than the predetermined target value. If during the next 10 seconds again two values are detected, which are above the target value, a cavitation level of 2 is assigned to such condition. Should within the next seconds again two values be detected, which are above the predetermined value, a cavitation of 3 is assigned. Based on the assigned cavitation level then a certain amount of water is dosed, wherein the amount is the larger, the higher the assigned cavitation level is. Upon having fed the rated amount of water into the sump, the cavitation level is reset to zero and the monitoring is continued.

In case that a lower cavitation level is detected, either a smaller amount of water can be fed into the sump, or, should a low cavitation level be detected, it could alternatively be checked whether in a subsequent time span again a cavitation signal is detected and only in case of a repeated detection of cavitation a rated amount of water then is fed into the sump.

In this manner cavitation of the circulation pump can be effectively prevented without feeding more water into the sump than absolutely necessary.

It is to be understood that while the method of the present invention could be designed to carry out the routines described above in either one of the exemplified embodiments, the washer and the method for operating the same preferably is designed to carry out the routines of more than one or all these embodiments.

BRIEF DESCRIPTION OF THE DRAWINGS

An example of a washer made in accordance with the teachings of the present invention will be described below by reference to drawings, in which.

DETAILED DISCUSSION

Figure 1:
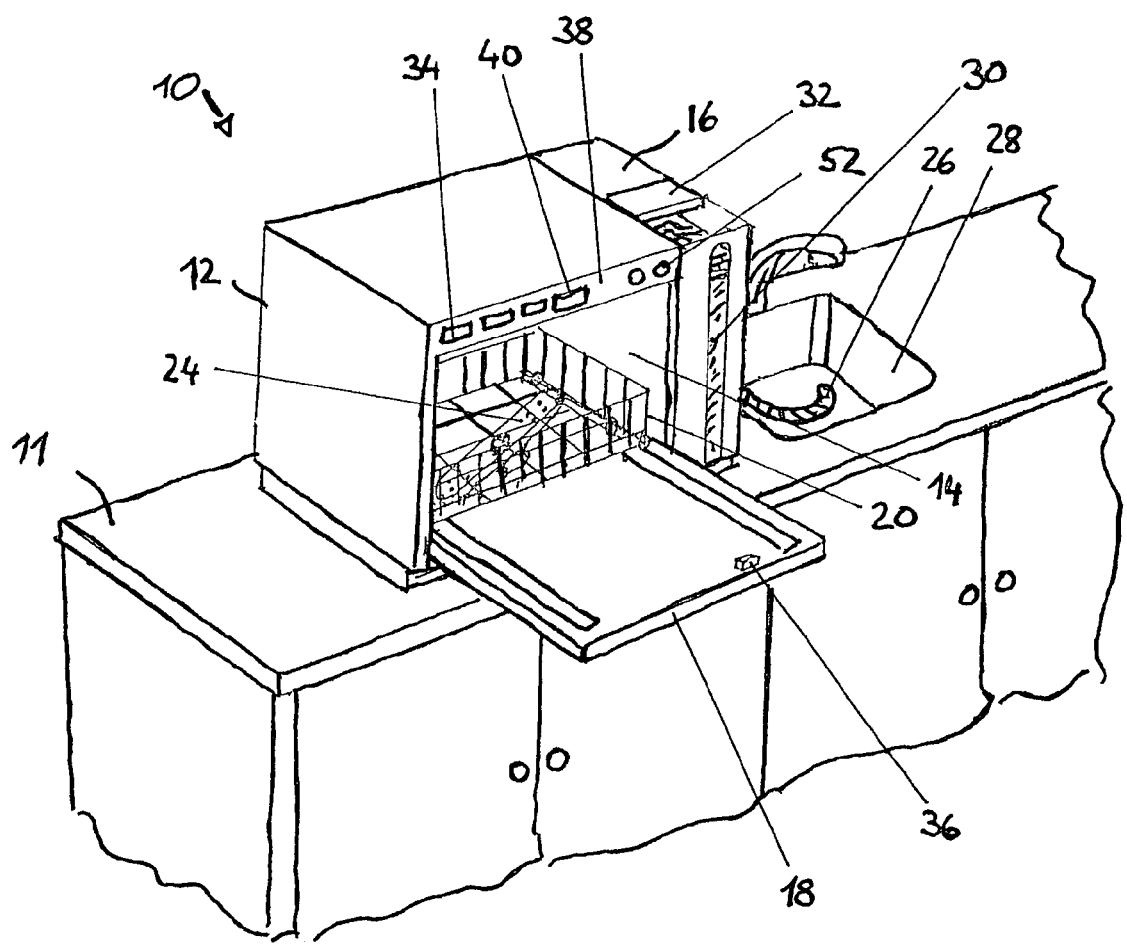
FIG. 1 is a perspective view of a dishwasher in accordance with the present invention.

FIG. 1 shows a dishwasher 10, which can be placed on top of a kitchen console 11 or which also could be used as a portable device for use, for example, within a camper van or yacht.

Dishwasher 10 which is designed to be placed on a kitchen console 11 comprises a housing section 12 and a tank section 16 into which a volume of the water is filled as it is required for an intended washing operation. In order to access the washing chamber, housing section 12 is provided with a door 18, which is tiltable about a vertical axis and which in the usual manner constitutes in its open state a support surface, on which a basket 20 can be placed, which holds any goods to be cleaned. Within the lower section of the washing chamber 14 there is provided a sump 22, in which water that is sprayed onto the goods to be cleaned by means of a rotatable spray arm 24 collects, to be again sprayed onto the goods to be cleaned.

Figure 2:
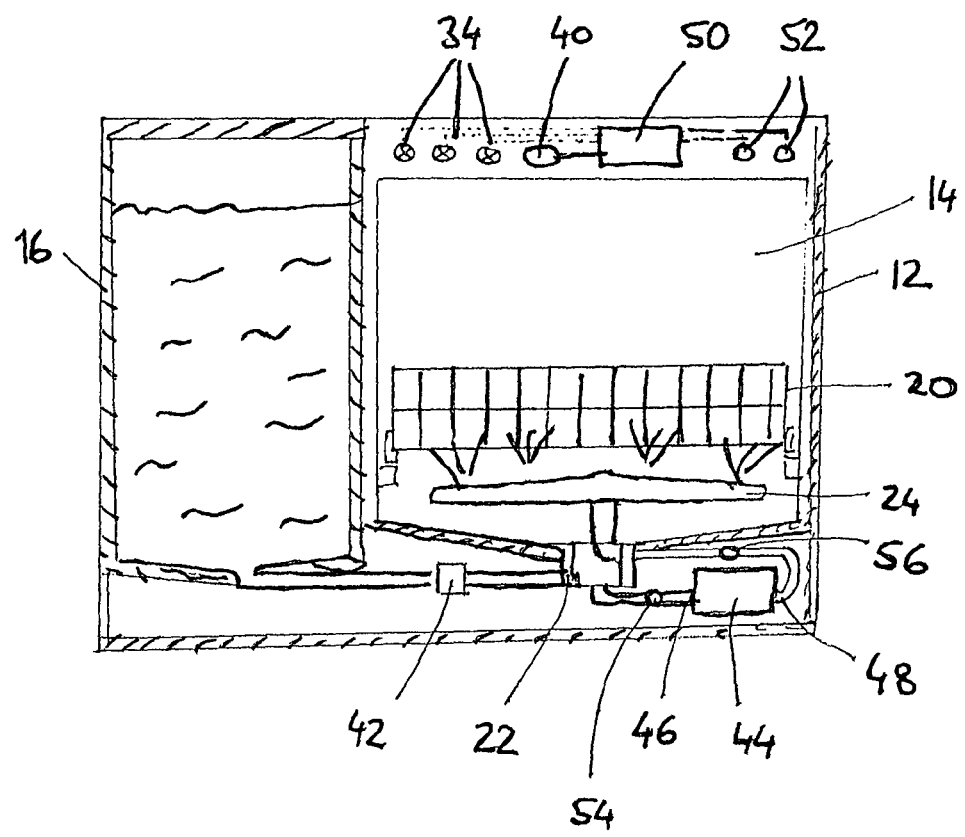
FIG. 2 is a schematic sectional view of the dishwasher of FIG. 1.

Water flows into the sump from tank 16 via a water inlet 42 (shown in FIG. 2 only) that is located at a level below the floor of the tank, so that the water is passed from the tank into the sump solely by the action of the hydrostatic pressure prevailing within tank 16. Sump 22 is connected to an inlet opening 46 for a circulation pump 44 (see FIG. 2) the outlet 48 of which feeds water to the rotatable spay arm 24. Any water which no longer is required for the washing cycle can be drained to waste via a drain conduit 26, the free end of which can be arranged temporarily within a sink 28 or could be connected permanently for example to a drain pipe of sink 28.

As shown in FIG. 1, tank 16 can be equipped with a window 30 through which the filling level of tank 16 is visible also when the lid 32 of tank 16 is closed. At the front side of the closed door or, as shown in the drawing, at a front panel 38 provided at the front side of housing section 12 there are provided a plurality of indicator lamps 34 by means of which a variety of operational states or warning messages can be issued to a user of the washing machine. Alternatively or additionally, acoustic indications can be provided by means of a speaker 40 which is provided within front panel 38.

Operation of the dishwasher is effected by means of a control unit 50 (see FIG. 2) which is adapted to carry out the various methods described above, and which operates the dishwasher in dependency of user inputs, such as settings made at selector switches 52, and sensor signals, such as the signal provided form a pressure sensor 54 which is located at an inlet conduit of circulating pump 44 or form a pressure sensor 56 is located at an outlet conduit of circulating pump 44, or the signal generated by a door sensor 36 (see FIG. 1) which is arranged at the inner side of door 18 and which provides a door opening signal to the control unit of the dishwasher to indicate whether or not the dishwasher door 18 has been opened.

LIST OF REFERENCE SIGNS 10 dishwasher
11 kitchen console
12 housing section
14 washing chamber
16 tank section
18 door
20 basket
22 sump
24 spray arm
26 drain conduit
28 sink
30 window
32 lid
34 indicator lamps
36 door sensor
38 front panel
40 speaker
42 water inlet
44 circulation pump
46 inlet opening
48 outlet
50 control unit
52 selector switch
54 pressure sensor
56 pressure sensor

The invention claimed is:

1. A method for operating a washer which comprises a washing chamber for accommodating goods to be cleaned, said washing chamber having in its lower portion a sump for collecting water during operation of the washer, a water inlet connected to a water tank detachably formed with the washer, a circulating pump for circulating water through the washing chamber, and a control unit for controlling a washing cycle carried out by the washer, the method comprising in subsequent steps:
   (a) feeding water from the tank via the water inlet into the sump by action of hydrostatic pressure prevailing within the water tank;
   (b) at least twice measuring pressure within an inlet or outlet conduit of the circulating pump by a pressure sensor when the water inlet is opened to feed water into the sump and storing the measured values;
   (c) comparing the values of subsequent measurements made during step (b) to obtain a differential value; and
   (d) generating a warning message to a user of the washer if the differential value obtained in step (c) is less than a predetermined value.

2. The method of claim 1, in which operation of the washer is paused if the differential value obtained in step (c) is less than a predetermined value.

3. The method of claim 1, in which the differential value obtained in step (c) is obtained by comparing the values of measurements between which a predetermined period of time has lapsed.

4. The method of claim 1, in which upon generation of a warning message it is checked whether there was an interaction with a user of the machine, and if so, steps (b) through (d) are repeated.

5. The method of claim 4, in which interaction with a user of the machine is checked by monitoring a sensor which senses opening of a door of the washer or the filling of the tank, in particular wherein the sensor issues a corresponding signal to the washer control unit.

6. The method of claim 1, wherein the water tank has a volume corresponding essentially to the amount of water required for executing a single program cycle.

7. The method of claim 1, further comprising in subsequent steps:
   (i) measuring the pressure when the circulating pump is in operation and storing the measured value;
   (ii) comparing the values measured in step (i) with a predetermined value;
   (iii) feeding a rated amount of water into the sump if in step (ii) it is determined that within a predetermined time interval a predetermined number of measured values exceeds the predetermined value; and (iv) repeating steps (i) to (iii) as long as the circulating pump is operating.

\* \* \* \* \*